United States Patent [19]

Dahms

[11] 4,136,228

[45] Jan. 23, 1979

[54] COLD PUNCHABLE LAMINATES

[75] Inventor: Ronald H. Dahms, Springfield, Mass.

[73] Assignee: Monsanto Company, St. Louis, Mo.

[21] Appl. No.: 822,768

[22] Filed: Aug. 8, 1977

[51] Int. Cl.² .................. B32B 27/10; B32B 27/42; C09J 3/14; B32B 27/08
[52] U.S. Cl. .................. 428/476; 428/506; 428/513; 428/514; 428/531; 428/920; 156/333; 156/335
[58] Field of Search ........... 428/506, 920, 513, 514, 428/530, 531, 507, 476; 156/335, 333

[56] References Cited

U.S. PATENT DOCUMENTS

| | | | |
|---|---|---|---|
| 2,931,782 | 4/1960 | Jarrett | 260/847 |
| 3,438,931 | 4/1969 | Mitchell et al. | 260/847 |
| 3,620,908 | 11/1971 | Dahms et al. | 428/514 X |
| 3,758,362 | 9/1973 | Brown | 428/514 X |
| 3,932,333 | 1/1976 | Ingram | 260/847 |

*Primary Examiner*—William R. Dixon, Jr.
*Attorney, Agent, or Firm*—David Bennett; William J. Farrington; James C. Logomasini

[57] ABSTRACT

This invention relates to industrial laminates which can be cold punchable and are flame resistant. The laminates are prepared from paper impregnated with a composition comprising a phenol-formaldehyde resole resin and a vinyl chloride interpolymer.

8 Claims, No Drawings

COLD PUNCHABLE LAMINATES

BACKGROUND OF THE INVENTION

In the art of making laminates of cellulosic substrates, it has long been appreciated that phenol-aldehyde resins tend to produce laminates of cellulosic materials which have relatively poor cold punchability characteristics and have poor flame resistance.

Heretofore, attempts have been made to use compositions of resole resins with plasticizers and flame retardants alone or in combination to produce laminates having punchability and flame resistance, but the results have suffered from a number of disadvantages. These compositions gave slow treating speed and much smoke when the impregnated paper was passed through an oven to drive off solvents. When this treated paper was made into laminates, they frequently had undesirably high water absorption, low flexural strength, surface exudation, erratic burning characteristics and poor electrical properties.

It has now been discovered that certain compositions comprising a phenol-aldehyde resole resin and a halogen containing interpolymer can be used to produce laminates incorporating cellulosic substrates in sheetlike form which not only give fast treating prepreg, with desirable water absorption and flexural strength but no surface exudation, good fire-smoke retarding characteristics, good electrical properties and excellent cold punchability.

This combination of a normally thermoplastic interpolymer and a thermosettable resin is typically in the form of an aqueous system in which the resole portion is dissolved while the halogenated interpolymer portion is suspended in the form of a latex. This combination is unusual because it is water dilutable or organic liquid dilutable. Laminates can be made by one-pass treatment avoiding a two-step impregnation process.

Cold punchable laminates are important because energy is not needed for heating prior to punching into household appliances and terminal boards, structural parts, electrical switches, instrument panels, insulating washers, switch parts, jack spacers and so forth.

SUMMARY OF THE INVENTION

This invention is directed to a cold punchable substantially nonporous laminate construction having low water absorption, fire resistance and high flexural strength comprising an integral combination of at least two cellulosic substrate sheet members arranged face-to-face in a layer sequence, each sheet member being impregnated with, and adhered to the adjoining layer by a thermoset composition comprising a phenol-aldehyde resole resin and a vinyl chloride interpolymer having comonomers selected from the group consisting of vinylidene chloride, vinyl acetate, acrylate esters, acrylic acid, acrylamide and ethylene or mixtures thereof.

The invention is also directed to a process for making a cold punchable substantially nonporous laminate construction using cellulosic substrate sheet members impregnated with from about 30 to 70 weight percent of a composition comprising phenolaldehyde resole resin and a vinyl chloride interpolymer having comonomers selected from the group consisting of vinylidene chloride, vinyl acetate, acrylate esters, acrylic acid, acrylamide and ethylene or mixtures thereof, the improvement which comprises the steps of:

A. impregnating said sheet members with said composition,
B. heating said impregnated sheet members at temperatures of from 30° to 180° C., for a time sufficient to dry and advance said composition to a flow value of from about 3 to 20%,
C. arranging said advanced sheet members in a desired layered sequence, and
D. laminating said layered sheets while maintaining pressures of about 50 to 2000 psi and temperatures of about 120° to 180° C., for a time sufficient to substantially thermoset said composition and form said laminate construction.

EXAMPLES

Examples of low molecular weight phenol-aldehyde resole resins having characteristics as described above and suitable for use in this invention are as follows:

EXAMPLE A

Phenol (100 parts) 50% formalin (111 parts), and triethylamine (five parts) are charged to a vessel. The resulting mixture is reacted at about 70° C., until the free formaldehyde content is less than about 4%, after which the mixture is cooled. The product is a low molecular weight water soluble phenol-formaldehyde resole resin.

EXAMPLE B

Phenol (100 parts), 50% formalin (80 parts), and triethylamine (five parts) are charged to a vessel. The resulting mixture is reacted at about 70° C., until the free formaldehyde content is less than about 4%, after which the mixture is cooled. The product is a low molecular weight water soluble phenolformaldehyde resole resin.

EXAMPLE C

Phenol (100 parts), 50% formalin (128 parts) and triethylamine (five parts) are charged to a vessel. The resulting mixture is reacted at about 70° C., until the free formaldehyde content is less than about 4%, after which the mixture is cooled. The product is a low molecular weight water soluble phenolformaldehyde resole resin.

Examples of thermoplastic interpolymer suitable for use in this invention are:

EXAMPLE D

A commercially available latex comprising an interpolymer of ethylene, vinyl chloride and an acrylamide containing monomer having a solids content of 50% by weight dispersed colloidally in an aqueous medium and known as Airflex 4514 supplied by Air Products and Chemicals (AIRCO) of Allentown, Pennsylvania.

EXAMPLE E

A commercially available latex comprising an interpolymer of vinylidene chloride and acrylic type monomers having a solids content of 50% by weight dispersed colloidally in an aqueous medium and known as Geon 660X1 from B. F. Goodrich Chemical Company, Cleveland, Ohio.

EXAMPLE F

A commercially available latex comprising an interpolymer of vinyl chloride and acrylic type monomers having a solids content of 50% by weight dispersed colloidally in an aqueous medium and known as Geon 460X2 from B. F. Goodrich Rubber Company, Akron, Ohio.

EXAMPLE G

A commercially available latex comprising an interpolymer of vinyl chloride, vinylidene chloride and acrylic type monomers having a solids content of 50% by weight dispersed colloidally in an aqueous medium and known as Geon 450X20 from B. F. Goodrich Rubber Company, Akron, Ohio.

EXAMPLES H-O

To prepare the impregnating compositions of this invention, a specific resole resin and a specific interpolymer are simply mixed together with stirring. Table I below gives examples of these compositions prepared from Examples A-G.

TABLE I

| Treating Composition | Resole Ex.# | Resole Amount | Halogenated Interpolymer Ex.# | Halogenated Interpolymer Amount |
|---|---|---|---|---|
| H | A | 100 | — | — |
| I | A | 70 | D | 30 |
| J | A | 50 | D | 50 |
| K | A | 65 | E | 35 |
| L | A | 65 | F | 35 |
| M | A | 65 | G | 35 |
| N | B | 70 | D | 30 |
| O | C | 70 | D | 30 |

Examples of laminate constructions of this invention made using treating compositions H-O above are prepared as follows:

Preformed cellulosic substrate types are chosen as follows:

Type 1 Nonwoven linters paper about 10 mils in thickness,

Type 2 Nonwoven unbleached Kraft paper about 10 mils in thickness,

Type 3 Nonwoven alpha-cellulose paper about 10 mils in thickness,

Type 4 Nonwoven bleached Kraft paper about 15 mils in thickness,

All types have an ash content less than about 0.9 weight percent.

The impregnation procedure for impregnating each above substrate type is as follows:

Cellulosic sheets are passed through the impregnating solution (Example I), drawn between squeeze rolls to remove excess resin and hung in an oven at 120° C., for drying. Resin contents as shown are thus obtained in each sample sheet so treated or otherwise as shown in Table II below.

Laminates are made from these impregnating sheets by stacking together these sheets in the form of green laminates to give 1/16" laminates. Each green laminate is then cured using a pressure of 1500 p.s.i., a temperature of from about 150° C., and a time of about 30 minutes. The resulting laminates are cold punchable without deleterious cracking when cold punched at 25° C., according to ASTM D-617. Flame resistance tests are run by Underwriter's Laboratory Test No. 94.

TABLE II

| Ex. | Treating Composition | Cellulosic Type | Resin Content, % | Laminate Punching | Flame Resistance |
|---|---|---|---|---|---|
| 1 | H | 2 | 50.2 | cracks | burns |
| 2 | I | 2 | 47.0 | no cracks | 13 |
| 3 | I + SB$_2$O$_3$ | 2 | 50.0 | | 0 |
| 4 | I + Zinc Borate | 2 | 47.0 | | 6 |
| 5 | I | 2 | 57.0 | | 2 |
| 6 | I | 1 | 48.0 | | 12 |
| 7 | J | 1 | 53.0 | | 2 |
| 8 | K | 2 | 48.0 | | 5 |
| 9 | L | 2 | 47.8 | | 15 |
| 10 | M | 2 | 49.2 | | 16 |
| 11 | N | 3 | 48.0 | | 14 |
| 12 | O | 4 | 47.0 | | 15 |

What is claimed is:

1. A cold punchable substantially nonporous laminate construction having low water absorption, fire resistance and high flexural strength comprising an integral combination of at least two cellulosic substrate sheet members arranged face-to-face in a layer sequence, each sheet member being impregnated with, and adhered to the adjoining layer by a thermoset composition consisting essentially of a phenol-aldehyde resole resin and a vinyl chloride interpolymer having comonomers selected from the group consisting of vinylidene chloride, vinyl acetate, acrylate esters, acrylic acid, acrylamide and ethylene or mixtures thereof wherein said laminate is impregnated with from 30-70% by weight of said composition, said composition being about 50 to 70% by weight of said resole resin and about 30 to 50% by weight of said vinyl chloride interpolymer.

2. A laminate of claim 1 wherein said interpolymer consisting essentially of a polymerized monomer mixture of from about 67 to 87% by weight of vinyl chloride, 10 to 30% by weight ethylene and 2 to 10% acrylamide and 0 to 5% by weight of vinyl acetate.

3. A laminate of claim 1 wherein said interpolymer consisting essentially of a polymerized mixture of 65 to 85% by weight of vinyl chloride, 13 to 33% by weight of an acrylate ester and 1 to 10% by weight of an acrylic acid.

4. A laminate of claim 1 wherein said interpolymer consisting essentially of a polymerized mixture of 30 to 50% by weight of vinyl chloride, 48 to 68% by weight of an acrylate ester and 1 to 10% by weight of an acrylic acid.

5. A laminate of claim 1 wherein said interpolymer consisting essentially of a polymerized mixture of 40 to 60% by weight of vinyl chloride, 15 to 25% by weight of vinylidene chloride, 20 to 30% by weight of an acrylate ester and 1 to 10% by weight of an acrylic acid.

6. A laminate of claim 1 wherein said composition contains 2 to 10% by weight of a fire retarding synergist selected from the group consisting of Sb$_2$O$_3$, and zinc borate or mixtures thereof.

7. A laminate of claim 1 prepared by
  A. impregnating said sheet members with said composition,
  B. heating said impregnated sheet members at temperatures of from 30° to 180° C. for a time sufficient to dry and advance said composition to a flow value of from about 3 to 20%,
  C. arranging said advanced sheet members in a layered sequence, and
  D. laminated said layered sheets while maintaining pressures of about 50 to 2000 psi and temperatures of about 120° to 180° C., for a time sufficient to substantially thermoset said composition and form said laminate construction.

8. In a process for making a cold punchable substantially nonporous laminate construction using cellulosic substrate sheet members impregnated with from about 30 to 70 weight percent of a composition consisting essentially of phenol-aldehyde resole resin and a vinyl chloride interpolymer having comonomers selected from the group consisting of vinylidene chloride, vinyl acetate, acrylate esters, acrylic acid, acrylamide and ethylene or mixtures thereof, the improvement which comprises the steps of:

A. impregnating said sheet members with said composition,

B. heating said impregnated sheet members at temperatures of from 30° to 180° C., for a time sufficient to dry and advance said composition to a flow value of from about 3 to 20%, C. arranging said advanced sheet members in a layered sequence, and D. laminating said layered sheets while maintaining pressures of about 50 to 2000 psi and temperatures of about 120° to 180° C., for a time sufficient to substantially thermoset said composition and form said laminate construction.

* * * * *